United States Patent [19]

Miller

[11] 4,014,111
[45] Mar. 29, 1977

[54] ORDNANCE TRAINING AID

[75] Inventor: Ralph L. Miller, Alexandria, Va.

[73] Assignee: The United States of America as represented by the Secretary of the Army, Washington, D.C.

[22] Filed: Dec. 9, 1975

[21] Appl. No.: 639,028

[52] U.S. Cl. .................................................. 35/25
[51] Int. Cl.² ......................................... G09B 9/00
[58] Field of Search ...................................... 35/25

[56] References Cited

UNITED STATES PATENTS

| 3,088,225 | 5/1963 | Amistadi | 35/25 |
| 3,238,642 | 3/1966 | Ohlund | 35/25 |
| 3,272,510 | 9/1966 | Ohlund et al. | 35/25 UX |

Primary Examiner—William H. Grieb
Attorney, Agent, or Firm—Nathan Edelberg; A. Victor Erkkila; Costa Perchem

[57] ABSTRACT

A training aid to simulate a warhead to provide realistic training for crimping and cutting procedures to gradually release pressure for disablement of the warhead.

1 Claim, 2 Drawing Figures

ORDNANCE TRAINING AID

GOVERNMENTAL INTEREST

The invention described herein may be manufactured, used and licensed by or for the Government for governmental purposes without the payment to me of any royalties thereon.

BACKGROUND OF THE INVENTION

This invention relates to a training aid for personnel involved with explosive ordinance disposal and other related tasks in training for bomb deactivation.

In the training of personnel for explosive ordinance disposal, it is important for safety reasons that the deactivation of a bomb be simulated in every minute detail to avoid the physical hazard associated with the actual explosive device. In the past it has been the practice in the art to duplicate the actual shell from which the explosive has been removed and then dismantled by the disposal personnel. In addition, it was customary to use original equipment, molds and drawings as training aids. However, in recent years the development of munitions using expensive hardware and equipment have made it costly to use the actual equipment for training aid purposes. Furthermore, the size of the weapon systems have made it cumbersome and costly to use for training purposes.

SUMMARY OF THE INVENTION

An object of this invention is to provide a training aid which has a realistic appearance of the actual munition area and which simulates only the essential elements of the munition required for deactivation.

Another object of this invention is to provide a training aid for weapon systems made of inexpensive materials that can be used repeatedly.

A further object of the invention is to provide an efficient and practical training aid which can be made in a rugged, inert, serviceable and portable form that can be used repeatedly in all types of environments.

Other objects and advantages of the invention will be apparent during the course of the following description.

In accordance with the present invention, there is provided a novel training device, which simulates the essential elements of the warhead required for deactivation of the munition. In addition, the external physical appearance of the training warhead is desirably also identical to the actual warhead section. The novel training device comprises in combination, a housing having a pair of cylinders containing pressurized gas. In addition, there is a tubing connecting the cylinders so that the pressure therein can be equalized. An aperture is provided in the housing to permit access to the tube connecting the cylinders.

BRIEF DESCRIPTION OF THE DRAWINGS

Throughout the following description like numerals are employed to designate like parts of the drawings.

DESCRIPTION OF THE PREFERRED EMBODIMENT

Figure 1:
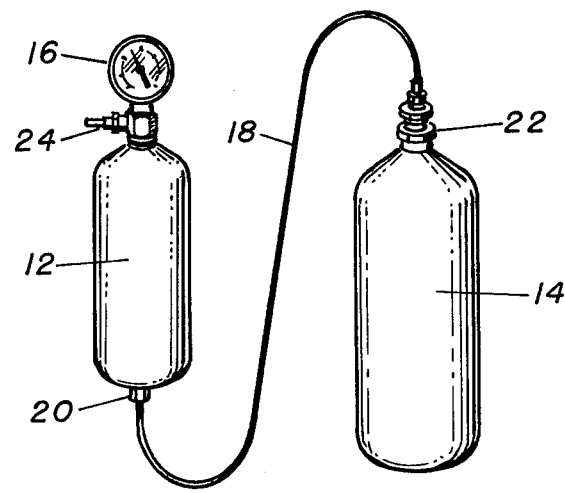
FIG. 1 is a diagrammatic view of the training aid constructed in accordance to this invention.
Figure 2:
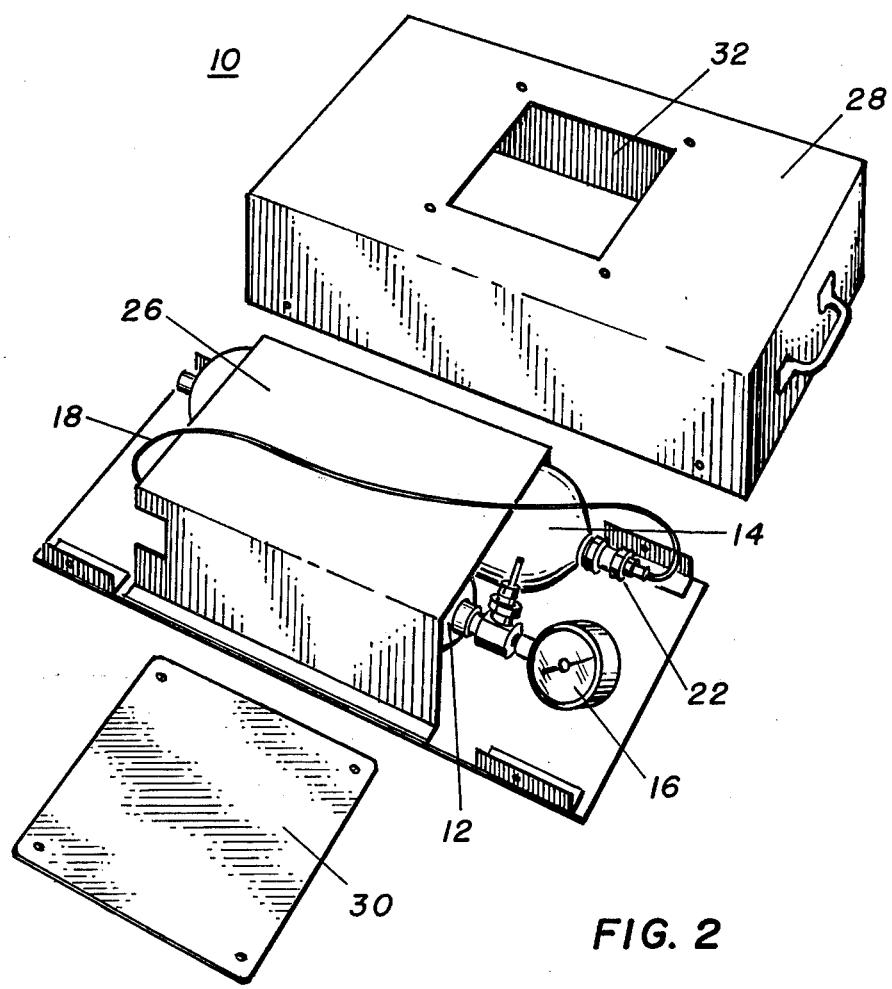
FIG. 2 shows a portable carrying case containing the training aid as illustrated in FIG. 1.

The drawings illustrate a preferred embodiment of the invention which consists of a housing 10 containing a pair of high-pressure cylinders 12 and 14 each having a volume of approximately 200 cubic inches and a capability to be pressurized with a suitable gas to 160 psi or other desired pressures. One of the cylinders 12 contains a pressure gage 16. A tube 18 connects the cylinder 12 with the cylinder 14 by means of compression fittings 20 and 22. An inlet valve 24 is placed near the pressure gage 16 so that the cylinders 12 and 14 may be re-pressurized for reuse. The tube 18 connecting the cylinders 12 and 14 runs between the bulkhead 26, and the outside top wall 28 of the housing 10. The tube 18 is accessable by removing plate 30 covering an access port or aperture 32 in wall 28 of the housing 10, thereby allowing the training procedures to be performed. The plate 30 and the tube 18 simulate exactly both structurally and visually the elements of the operative weapon system required for warhead disablement operations.

In operation, the access port 32 secured by plate 30 is removed, revealing tube 18 to the trainee. Two pinch clamps (not shown) are placed on the tube 18 approximately 2 inches apart and the tube 18 is severed therebetween. Thereafter, the clamps are loosened intermittently in order to permit a gradual release of the pressure in the cylinders, which results in the deactivation of the weapon system. This structure represents an identical relationship to the actual weapon system, which comprises two chambers each containing pressurized gas and connected by a conduit for gas communication between the chambers.

The tube 18 connecting the cylinders is easily replaced after each use, since the ends thereof are attached to the cylinders by compression fittings. Upon completion of the assembly of the tube, the unit is pressurized with air for reuse. The novel training aid will give explosive ordinance disposal personnel practice in the field in deactivating damaged or defective items in case of an accident or misuse of the weapon system.

I claim:
1. A portable ordinance training aid comprising:
a housing having a cover portion;
a base portion removably attached to said cover portion;
a pair of gas pressurized cylinders in said housing;
a bulkhead for mounting said cylinders on said base portion;
an inlet valve for pressurizing said cylinders;
a tube connecting said pressurized cylinders to equalize pressures therein;
a pressure gage attached to at least one of said cylinders; and
an aperture in said housing for access to said tube.

* * * * *